United States Patent
Keevill et al.

(10) Patent No.: US 8,909,294 B2
(45) Date of Patent: *Dec. 9, 2014

(54) LOCAL AREA CELLULAR BASESTATION

(71) Applicant: Ubiquisys Limited, Swindon (GB)

(72) Inventors: Peter Keevill, Bath (GB); William Franks, Pewsey (GB); Richard Byrne, Thatcham (GB); Andrea Giustina, Milan (IT)

(73) Assignee: Ubiquisys Limited, Swindon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/251,302

(22) Filed: Apr. 11, 2014

(65) Prior Publication Data

US 2014/0243000 A1  Aug. 28, 2014

Related U.S. Application Data

(63) Continuation of application No. 13/719,117, filed on Dec. 18, 2012, now Pat. No. 8,738,084, which is a continuation of application No. 13/481,643, filed on May 25, 2012, now Pat. No. 8,676,265, which is a continuation of application No. 11/664,425, filed as application No. PCT/GB2006/002819 on Jul. 28, 2006, now Pat. No. 8,204,543.

(30) Foreign Application Priority Data

Aug. 1, 2005  (GB) .................................... 0515888.6
May 30, 2006  (GB) .................................... 0610650.4

(51) Int. Cl.
*H04M 1/00* (2006.01)
*H04W 4/00* (2009.01)
*H04W 88/08* (2009.01)

(52) U.S. Cl.
CPC .................................... *H04W 88/08* (2013.01)
USPC ...................... 455/561; 455/426.1; 455/556.1; 455/426.2; 455/552.1; 370/338; 370/401; 370/280

(58) Field of Classification Search
USPC .............. 455/502, 456.1, 519, 524, 511, 445, 455/561; 370/328, 347, 329, 350; 342/357.75, 450; 719/328
See application file for complete search history.

(56) References Cited

U.S. PATENT DOCUMENTS 5,438,608 A   8/1995   Kojima
5,778,322 A   7/1998   Rydbeck
(Continued)

FOREIGN PATENT DOCUMENTS

CN   1643816   7/2005
DE   196 33 925   3/1998
(Continued)

OTHER PUBLICATIONS

IN Office Action dated May 6, 2014 in IN Application No. 141/MUMNP/2008.

(Continued)

*Primary Examiner* — Mahendra Patel
(74) *Attorney, Agent, or Firm* — Weaver Austin Villeneuve & Sampson LLP

(57) ABSTRACT

This invention relates to a cellular basestation, and in particular to a basestation for a cellular communications network, that can conveniently be used to provide a cellular service, for example within a home or office.

8 Claims, 4 Drawing Sheets

(56) References Cited

U.S. PATENT DOCUMENTS

| | | | |
|---|---|---|---|
| 5,794,157 | A | 8/1998 | Haartsen |
| 5,796,742 | A | 8/1998 | Klotzbach et al. |
| 6,014,563 | A | 1/2000 | Szabo |
| 6,236,859 | B1 | 5/2001 | Morper |
| 6,351,638 | B1* | 2/2002 | Robinson ............... 455/418 |
| 6,615,035 | B1 | 9/2003 | Lucidarme et al. |
| 6,850,763 | B1 | 2/2005 | Naqvi et al. |
| 6,901,061 | B1 | 5/2005 | Joo et al. |
| 7,058,415 | B2 | 6/2006 | Bushnell et al. |
| 7,193,985 | B1 | 3/2007 | Lewis et al. |
| 7,266,393 | B2 | 9/2007 | Latva-Aho et al. |
| 7,308,255 | B2 | 12/2007 | Loveland |
| 7,466,991 | B2 | 12/2008 | Everson et al. |
| 8,204,543 | B2 | 6/2012 | Keevill |
| 8,676,265 | B2 | 3/2014 | Keevill et al. |
| 2001/0044305 | A1 | 11/2001 | Reddy et al. |
| 2002/0069278 | A1 | 6/2002 | Forslow |
| 2002/0085516 | A1* | 7/2002 | Bridgelall ............ 370/329 |
| 2002/0089951 | A1 | 7/2002 | Hyun et al. |
| 2002/0165000 | A1 | 11/2002 | Fok |
| 2002/0191561 | A1 | 12/2002 | Chen et al. |
| 2003/0003906 | A1 | 1/2003 | Demers et al. |
| 2003/0058818 | A1 | 3/2003 | Wilkes et al. |
| 2003/0119489 | A1 | 6/2003 | Mohammed |
| 2003/0134650 | A1* | 7/2003 | Sundar et al. ............ 455/465 |
| 2004/0017786 | A1 | 1/2004 | Shively |
| 2004/0176077 | A1* | 9/2004 | Loveland ............ 455/414.1 |
| 2004/0204097 | A1 | 10/2004 | Scheinert et al. |
| 2004/0214576 | A1 | 10/2004 | Myers et al. |
| 2004/0266426 | A1* | 12/2004 | Marsh et al. ............ 455/426.2 |
| 2005/0037766 | A1 | 2/2005 | Hans et al. |
| 2005/0058125 | A1 | 3/2005 | Mutikainen et al. |
| 2005/0068941 | A1* | 3/2005 | Erhart ............... 370/352 |
| 2005/0070283 | A1 | 3/2005 | Hashimoto et al. |
| 2005/0088999 | A1* | 4/2005 | Waylett et al. ............ 370/338 |
| 2005/0193015 | A1 | 9/2005 | Logston et al. |
| 2005/0286466 | A1* | 12/2005 | Tagg et al. ............ 370/329 |
| 2006/0052085 | A1 | 3/2006 | Rodriguez et al. |
| 2006/0211448 | A1* | 9/2006 | Reiss et al. ............ 455/553.1 |
| 2006/0251051 | A1 | 11/2006 | Bhatt et al. |
| 2009/0017864 | A1 | 1/2009 | Keevill et al. |
| 2012/0238324 | A1 | 9/2012 | Keevill et al. |
| 2013/0178217 | A1 | 7/2013 | Keevill et al. |

FOREIGN PATENT DOCUMENTS

| | | |
|---|---|---|
| EP | 0 766 427 | 4/1997 |
| EP | 1 032 236 | 8/2000 |
| EP | 1 049 340 | 11/2000 |
| EP | 1267524 A2 | 12/2002 |
| EP | 1 650 907 | 4/2006 |
| GB | 2 321 158 | 7/1998 |
| GB | 2 355 885 | 5/2001 |
| GB | 2419774 | 5/2006 |
| JP | H09-135479 | 5/1997 |
| JP | 2001-197557 A | 7/2001 |
| JP | 2003-274011 A | 9/2003 |
| JP | 2004-064655 | 2/2004 |
| JP | 2004-515137 | 5/2004 |
| JP | 2004-531975 | 10/2004 |
| JP | 2005-109570 | 4/2005 |
| JP | 2006-180474 | 7/2006 |
| WO | WO 01/76276 | 11/2001 |
| WO | WO 02/054820 | 7/2002 |
| WO | WO 02/073883 | 9/2002 |
| WO | WO 02/093811 | 11/2002 |
| WO | WO 03/019971 | 3/2003 |
| WO | WO 03/028344 | 4/2003 |
| WO | WO 03/032616 | 4/2003 |
| WO | WO 03/061177 | 7/2003 |
| WO | WO 03/063404 | 7/2003 |
| WO | WO 03/084096 | 10/2003 |
| WO | WO 03/085992 | 10/2003 |
| WO | WO 03/090013 | 10/2003 |
| WO | WO 2004/086788 | 10/2004 |
| WO | WO 2005/057968 | 6/2005 |
| WO | WO 2005/107195 | 11/2005 |
| WO | WO 2005/112410 | 11/2005 |
| WO | WO 2005/114918 | 12/2005 |
| WO | WO 2005/114920 | 12/2005 |
| WO | WO 2006/005999 | 1/2006 |

OTHER PUBLICATIONS

Notice of Allowance dated Feb. 24, 2012, U.S. Appl. No. 11/664,425.
Notice of Allowance dated Jan. 5, 2012, U.S. Appl. No. 11/664,425.
Notice of Allowance dated Nov. 28, 2011, U.S. Appl. No. 11/664,425.
Final Office Action dated May 9, 2011, U.S. Appl. No. 11/664,425.
Office Action dated May 13, 2010, U.S. Appl. No. 11/664,425.
Office Action dated Jul. 18, 2012, U.S. Appl. No. 13/481,643.
Final Office Action dated Feb. 5, 2013 U.S. Appl. No. 13/481,643.
Notice of Allowance dated Oct. 28, 2013 U.S. Appl. No. 13/481,643.
Notice of Allowance dated Jan. 16, 2014 U.S. Appl. No. 13/719,117.
CN First Office Action dated Jan. 26, 2011, CN App No. 200680036511.2.
CN Second Office Action dated Dec. 21, 2011, CN App No. 200680036511.2.
CN Third Office Action dated Aug. 31, 2012, CN App No. 200680036511.2.
EP Examination Report dated Sep. 12, 2008, App No. EP 06 765 153.9-2412.
GB Search and Examination Report dated Jun. 26, 2008, Application No. GB 0807816.4.
GB Search and Examination Report dated Jul. 2, 2008, Application No. GB 0807818.0.
GB Search and Examination Report dated Jul. 7, 2008 in Application No. GB 0610650.4.
JP Office Action dated Nov. 4, 2011, Patent Application No. 2008-524576.
JP Office Action dated Aug. 26, 2013, Patent Application No. 2012-105452.
PCT International Search Report dated Feb. 23, 2007, Application No. GB2006/002819.
PCT Written Opinion dated Feb. 1, 2008, Application No. GB2006/002819.
Letter from Richard Byrne dated Sep. 19, 2013 referencing US Publication No. 2013/0178217 (U.S. Appl. No. 13/719,117).
Deed of Agreement dated Aug. 1, 2005 between Consultant [Richard Byrne] and Ubiquisys Limited.

* cited by examiner

LOCAL AREA CELLULAR BASESTATION

This application is a continuation of and claims priority to U.S. patent application Ser. No. 13/719,117, filed Dec. 18, 2012, and titled "LOCAL AREA CELLULAR BASESTATION", which is a continuation of U.S. patent application Ser. No. 13/481,643, filed May 25, 2012, now U.S. Pat. No. 8,676,265, issued Mar. 18, 2014, and titled "LOCAL AREA CELLULAR BASESTATION", which is a continuation of U.S. patent application Ser. No. 11/664,425, filed Mar. 29, 2007, now U.S. Pat. No. 8,204,543, issued Jun. 19, 2012, and titled "LOCAL AREA CELLULAR BASESTATION", each of which is hereby incorporated by reference in its entirety. U.S. patent application Ser. No. 11/664,425 is a national phase filing under 35. U.S.C. §371 from PCT/GB2006/002819, filed on Jul. 28, 2006. PCT/GB2006/002819 claims priority from United Kingdom Patent Application No. 05 15888.6 filed on Aug. 1, 2005 and United Kingdom Patent Application No. 06 10650.4 filed on May 30, 2006. These documents are hereby incorporated by reference and for all purposes.

This invention relates to a cellular basestation, and in particular to a basestation for a cellular communications network, that can conveniently be used to provide a cellular service, for example within a home or office.

Wide area cellular services for standards such as GSM and UMTS are generally provided from conventional basestations, which are capable of covering a large area (cell radius of many kilometres). However, coverage within buildings can be more challenging because of the RF attenuation of the building structure and radio shadowing effects from surrounding buildings. This coverage problem becomes more difficult for standards aiming to support medium to high speed data such as EDGE and UMTS, because of the higher signal-to-noise figures required for signals using high-order constellations or low spreading factors. Higher frequencies, such as those used for UMTS, also accentuate the problem, because these signals suffer greater attenuation through building structures.

Conventional solutions to these problems would be to deploy many more basestations and RF repeater systems to increase coverage within buildings and urban areas. These solutions become prohibitively costly and the additional aesthetic impact of many more basestations in populated areas creates objections from residents and additional legal expenses for operators. The use of short-range radio interfaces such as WiFi or Bluetooth to handle cellular traffic within a home or office is an alternative approach, but requires the customer or operator to invest in new handsets.

Recent figures suggest over 70% of all cellular calls are made within buildings so this issue presents some significant obstacles to the future growth of the cellular industry.

It is known to provide a wireless access point, for example in accordance with the IEEE 802.11 standard, which allows a computer user to make a wireless connection to a computer network, such as the internet, in order to be able to access data.

However, this type of wireless access point has the limitation that it does not allow access by any of the very large number of existing cellular mobile communications devices.

US2004/0204097 discloses a low power basestation, for establishing a small area of wireless coverage within a macrocell network, for example within a building such as a customer's home or office. This basestation may be connected into a conventional wireless network infrastructure by means of an existing IP connection within the home or office.

However, this has the limitation that the user is able to use his mobile communications device only within that wireless network, and is therefore tied to the charging structures of the operator of the wireless network.

According to a first aspect of the present invention, there is provided a base station for a cellular wireless communications network, comprising:
    a first interface, enabling connection with a remote communications device using a cellular wireless communications protocol in the cellular wireless communications network;
    a second interface, enabling connection over a wide area network; and
    a third interface, enabling connection over a local area network,
    and further comprising:
    software for enabling communication over the wide area network between a remote communications device, connected to the first interface, and a core network of the cellular wireless communications network; and
    software for enabling communication over the local area network between a remote communications device, connected to the first interface, and a device connected to the local area network, without using the core network of the cellular wireless communications network.

This has the advantage that the user is able to communicate with a device connected to the local area network, without needing to use the core network of the cellular wireless communications network.

According to a second aspect of the present invention, there is provided a base station for a cellular wireless communications network, comprising:
    a first interface, enabling connection with a remote communications device using a cellular wireless communications protocol in the cellular wireless communications network; and
    a second interface, enabling connection over a wide area network;
    and further comprising:
    software for enabling communication over the wide area network between a remote communications device, connected to the first interface, and a core network of the cellular wireless communications network; and
    software for enabling communication over the wide area network between a remote communications device, connected to the first interface, and a network server connected to the wide area network to allow data to be downloaded from said computer to the remote communications device without using the core network of the cellular wireless communications network.

This has the advantage that the user is able to communicate with a device connected to the wide area network, without needing to use the core network of the cellular wireless communications network.

DETAILED DESCRIPTION

Figure 1:
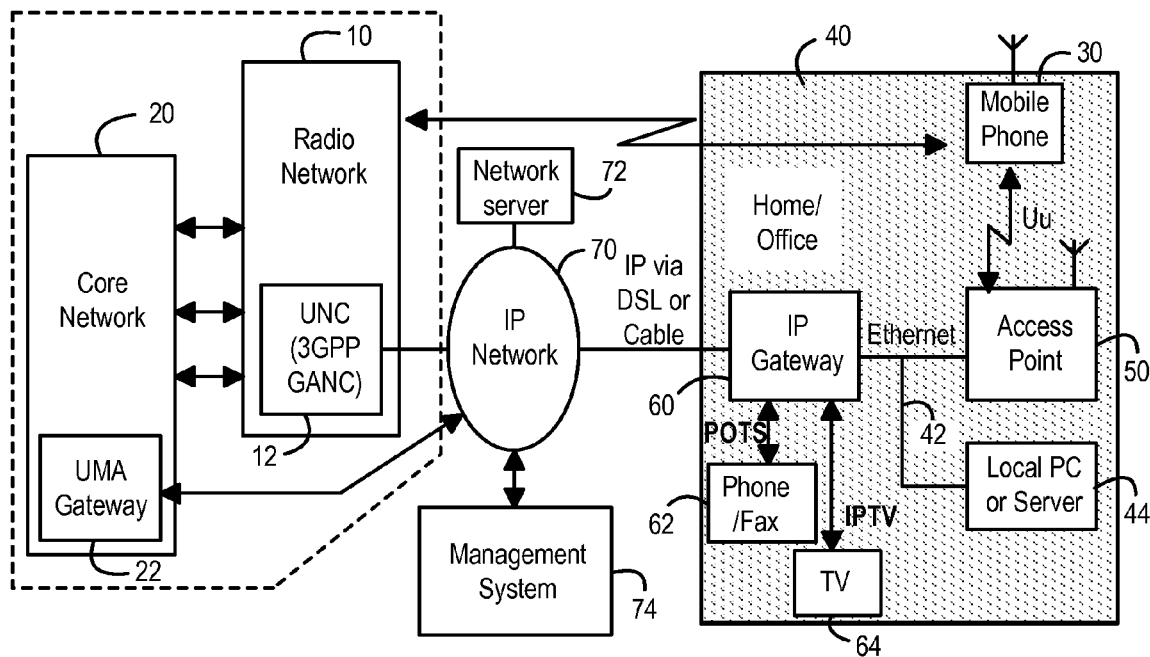
FIG. 1 is a block schematic diagram of a system incorporating a basestation in accordance with the present invention.

FIG. 1 is a block schematic diagram, illustrating a system architecture. A mobile network operator (MNO) owns and operates a wireless communications network, including a radio network 10, including a network of cellular basestations (not shown), and a core network 20, having a connection into the fixed telephone network. These are generally conventional, except as described below.

A mobile phone 30, when roaming in the territory covered by the wireless communications network, is able to establish a wireless connection with one of the cellular basestations, in order to communicate with other telephones in the fixed telephone network, or with other mobile phones, which have established their own wireless connections with a cellular basestation, and hence with the fixed telephone network.

In accordance with the present invention, there is provided, for example within a home or office 40 or in another location where additional wireless coverage is required, a further basestation, or access point, 50. This access point 50 is provided for use by the owner of the premises where it is located, but is integrated into the wireless communications network, such that the mobile phone 30 can handoff from the access point 50 to another basestation when leaving the immediate vicinity of the access point 50, or can handoff to the access point 50 from another basestation when returning to the immediate vicinity of the access point 50.

The access point 50 therefore acts as a basestation within the relevant wireless communications network. For example, it can allow an entirely conventional and unmodified mobile phone 30 or other user device to establish a connection for voice and/or data services using GSM/GPRS and/or UMTS air interfaces. Of course, the access point 50 can be enabled to establish connections with the mobile phone 30 using the standard air interface of any suitable cellular wireless communications system.

The access point 50 has a connection for an Ethernet Local Area Network (LAN) 42, within the home or office 40. As shown in FIG. 1, the access point 50 can connect over the Ethernet LAN 42 to one or more local PCs or servers 44.

The access point 50 can connect over the Ethernet LAN 42 to an IP gateway device 60. The IP gateway device 60 provides an IP connection over an IP network 70, for example the internet, to the MNO network either via a Digital Subscriber Line (DSL) or via other IP transport methods such as a digital multimedia Cable network. Thus, the existing IP connection from the home or office can be used to provide backhaul from the access point 50. Flexible interfacing to the operator's core network 20 can be provided via the Unlicensed Mobile Access (UMA) standard through a UMA gateway 22. This approach enables low-cost transport of data and voice using Voice-over-Internet Protocol (VoIP) techniques.

The connection from the IP gateway 60 over the IP network 70 into the MNO Radio Access Network 10 is provided by a UMA Unlicensed Network Controller (UNC) 12, which has been standardised by 3GPP as a Generic Access Network Controller (GANC). Other non-standardised solutions to interface to the Radio Access Network 10 could also be employed as an alternative approach.

In this illustrated embodiment, the DSL or cable IP gateway device 60 includes provision for connection of a POTS telephone or fax device 62, and audio/video connections for providing IPTV services to a TV 64. The access point 50 includes a services environment which allows these facilities to be integrated into the MNO network, enabling sophisticated new services for users.

In an alternative implementation of the invention, the access point 50 can be integrated as a component within the IP gateway device 60; an internal IP connection then links the embedded access point component to the router functions within the IP gateway device. This configuration can potentially provide a lower overall cost and is convenient for operators looking to provide gateway units which unify data, fixed voice, multimedia and mobile services.

Thus, while the mobile phone 30 is within the home or office 40, or otherwise within the coverage area of the access point 50, it can connect into the MNO network in the same way as via any other basestation in the cellular wireless communications network.

FIG. 1 also shows a network server 72 connected to the IP network 70. As will be appreciated, where the IP network 70 is the internet, a very large number of servers and other devices are connected to the network. As will be described in more detail below, the user of the mobile phone 30 can access such devices by means of the access point 50.

FIG. 1 also shows a management system 74, connected to the IP network 70.

Figure 2:
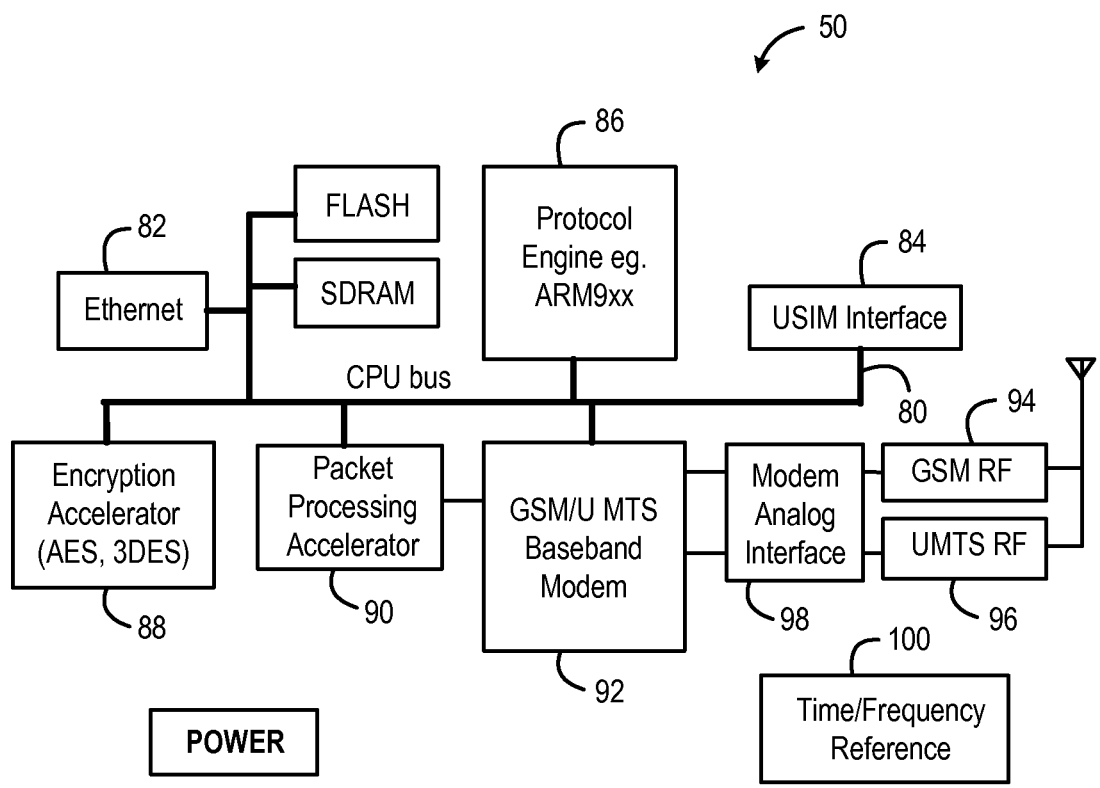
FIG. 2 is a block schematic diagram illustrating the hardware architecture of a basestation in accordance with the present invention.

FIG. 2 is a block schematic diagram, showing the hardware architecture of the access point 50. The architecture consists of a number of functional blocks interconnected by a processor bus 80 such as the ARM AMBA bus.

The access point 50 includes various external wired interfaces, including an RJ45 Ethernet 10/100 interface 82, which provides a connection to a local LAN for connection to the IP gateway device 60 and thence to the MNO network and the Internet, and also provides access to other devices attached to the Ethernet network, such as one or more PC 44, or such as an IPTV 64 for advanced service provision. The access point 50 can therefore have an IP-based interface to the Radio Access Network 10 through adaptation of the standard UMA UNC, as opposed to the usual Iub (UMTS) or Abis (GSM) interfaces.

The access point 50 also includes a Subscriber Identification Module (SIM) card interface 84 to allow use of a standard SIM card to provide a unique identifier for the access point 50, in order to identify the unit to the management system 74 and the operator's radio network 10 and core network 20, and thereby enable various services to be provided.

The access point 50 also includes a Protocol Engine 86, implemented as a small embedded CPU such as an ARM926 (with appropriate peripherals) supported by a dedicated co-processor 88 for encryption and a dedicated co-processor 90 for packet processing, which will offload the main CPU for specific intensive tasks. For example, encryption of the IPSec packet payload is handled by the encryption accelerator 88, which supports AES and 3DES encryption protocols. The VPN connection of the access point 50 to the UNC 12 and the management system 74 will make use of the internal encryption processing; user VPN encryption processing may be handled outside the access point 50.

The main CPU is also responsible for the configuration and control, via the main CPU bus 80, of all functional blocks in the system including a baseband modem 92 and the Ethernet port 82. The system software image, including configuration data for all system functional blocks is stored in FLASH memory 94 within the access point 50; two complete system images are stored so that updated system images can be downloaded to the access point 50 from the management system 74, whilst the previous image is retained as a fall back option in case of corrupted download. access point 50

The main CPU peripherals include: watchdog timers for software sanity checking, JTAG and serial ports for in-system debug, and a GPIO for system control including LED status indication, system power management and system alarm gathering.

The access point 50 has a first RF Interface 94 for GSM at either 900 MHz or 1800 MHz and a second RF Interface 96 for UMTS at 2100 MHz. It therefore supports simultaneous operation of GSM and UMTS. For the GSM and UMTS receive paths both uplink (basestation receive) and downlink (terminal receive) frequencies are accessible; for the transmit paths only downlink (basestation transmit) frequencies are available. At installation, the access point 50 selects a downlink RF carrier frequency with the lowest noise/interference for both GSM and UMTS from permitted lists of GSM and UMTS carrier frequencies provided by the management system 74; permitted downlink frequencies will be scanned by the access point 50 with its receive path configured in UE mode and its transmit path disabled.

The access point 50 is designed to provide cellular service over a distance of less than 50 m to stationary or pedestrian (for example, no more than 10 km/h) users within a building, and hence the transmit power required is dramatically reduced compared to a conventional macrocell basestation.

The RF interfaces 94, 96 are connected through a modem analog interface 98 to the baseband modem 92, which supports sample rate processing, chip-rate processing (UMTS only) and symbol rate processing for the GSM and UMTS basestation modems.

The access point 50 will have limited GSM Mobile Station (MS) and UMTS User Equipment (UE) modem functionality, in order to allow the access point 50 to recover the Broadcast Channel (BCH) from local GSM/UMTS basestations and other nearby access points. UE modem mode will be entered during initial installation to survey the local RF environment and at regular intervals after the initial installation to monitor the RF environment and, if necessary, modify the access point configuration.

The baseband modem 92 is implemented using a software-based architecture to ensure high adaptability over a field life of up to 5 years, for example, being upgradeable to allow future enhancement to HSDPA or EDGE service to be delivered in the field without the need to replace the unit.

The access point 50 includes timing and frequency references 100 which provide sufficient accuracy for GSM and UMTS basestation operation over a 5 year lifetime.

This embodiment of the access point 50 therefore provides various operational features. For example, it is user Installable, self-configuring, and adaptive to the surrounding RF environment. Access can be restricted to specified users using standard GSM/UMTS protocols. Further, multiple access point units installed in a large indoor area connected to a common Ethernet LAN can manage handoffs between themselves without the intervention of other systems in the radio network 10 or the core network 20 of the operator's cellular network.

Figure 3:
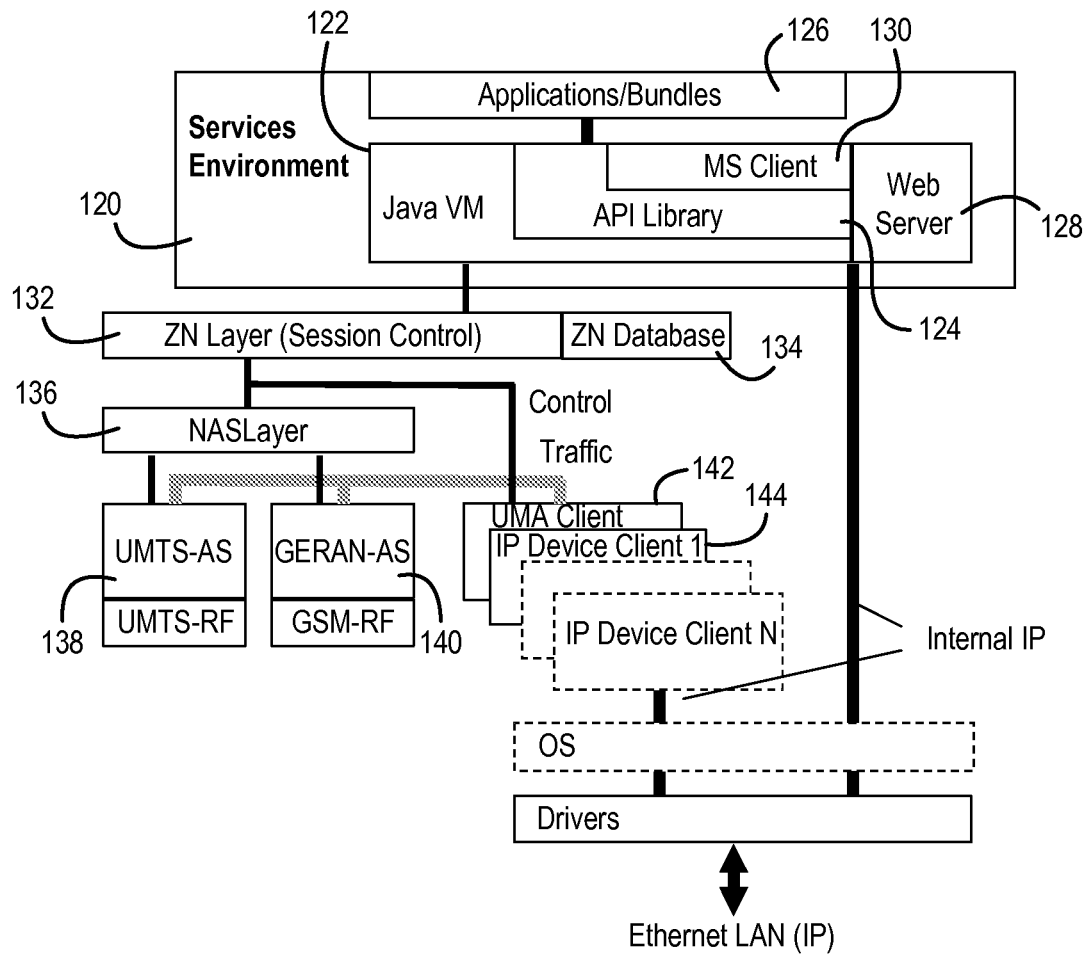
FIG. 3 is a block schematic diagram illustrating the software architecture of a basestation in accordance with the present invention.

FIG. 3 provides a conceptual overview of the architecture of the software running on the protocol engine 86 of the access point 50, together with the encryption accelerator 88 and the packet processing accelerator 90, with an emphasis on the Services Environment and its control paths into the lower stack layers.

The access point 50 includes a services platform, which can exploit the potential of the union of four data networks, namely the external MNO core network 20, the external internet 70, mobile devices such as the mobile phone 30 (via GSM/UMTS), and the home network (via Ethernet).

The access point stack architecture includes a powerful services environment 120.

The services environment is Java-based and includes a Java Virtual Machine 122, and an access point library 124, in the form of an API interface which allows applications 126 to interact with the lower layers of the stack to control calls/data sessions, traffic routing and many other functions. The services environment 120 also includes a web server 128, which provides a convenient interface to the user for configuration and monitoring and also for selection and purchase of desired applications, with security protected options for debug and maintenance via a local PC. The services environment 120 also includes a management system (MS) client 130, which configures the access point 50 and monitors various aspects of its operation. The MS client 130 controls the provisioning system so that any component of the software in the system, as shown in FIG. 3, can be replaced and restarted.

As mentioned above, the services environment 120 also includes various applications 126, for example created by the mobile network operator or the IP gateway 60 provider, which can be pre-installed in the access point 50, or can be delivered via download from the operator's network at the operator's initiation or at user request, for example as part of a chargeable service.

A network (ZN) layer 132 of the software provides session control functions to manage and implement the service flows and policies that determine how the access point 50 is configured and operates for any particular Mobile Network Operator (MNO) configuration and end-user settings. Configuration parameters are loaded to the ZN database 134 via the management system (MS) client 130, Java applications or via the Web Server 128. These parameters provide the "rules" for the session control operation within the access point. Session control functions include: implementation of the policies for registration, call control and traffic flow/routing for the access point 50 on the MNO core network; control of the UMA client (to be described further below) for registration, call control and traffic flow; and efficient management of access point ZAP resources in delivering GSM/UMTS services and interacting with other services via the IP gateway 60.

Below the network (ZN) layer 132 of the software, there is the Non Access Stratum (NAS) functionality 136, which is required in order for services to be provided to the UE when the MNO GSM/UMTS core network 20 is not connected to the access point 50. This functionality enables the access point 50 to offer the usual GSM/UMTS services, such as SMS and MMS which mobile users are accustomed to, whilst not being connected to the GSM/UMTS core network. In order for such services to be offered, the access point 50 contains a condensed subset of the core network functions usually contained in the Mobile Switching Cente (MSC), Serving GPRS Service Node (SGSN), GSM Basestation Subsystem (BSS), and UMTS Radio Network Subsystem (RNS).

The Non-Access Stratum layer 136, as implemented in the access point 50, therefore provides various functions which are typically included in MSC and SGSN nodes within a conventional GSM/UMTS network. One such feature is call control (CC). This supports call establishment between two peer entities, mainly for circuit-switched connections.

The NAS layer 136 also provides session management (SM), for control of packet data sessions; a Short Message Service (SMS) server, for transmission of SMS messages between the access point 50 and the network SMS service centre; supplementary services (SS), such as call waiting, call holding, and multi-party calling; Mobility Management/GPRS Mobility Management (MM/GMM), for management of UE mobility elements, such as location registration, authentication, and ciphering; and control functions associated with the SIM card which may be fitted to the access point 50. The access point 50 also provides packet routing capability, which is essentially GGSN functionality in a conventional network.

Below the NAS functionality, there is the Access Stratum functionality, specifically the UMTS Access Stratum functions 138 and the GERAN Access Stratum functions 140.

The UMTS Access Stratum functionality 138 comprises Radio Network Controller (RNC) functionality and an interface to the UMTS physical layer implemented on the baseband modem 92. The RNC and physical layer interface functionality is required for all access point services supporting UMTS, regardless of the core network interface used.

In more detail, the RNC functionality comprises the following elements:

Packet Data Convergence Protocol (PDCP)

Header compression and decompression of IP data streams (optional), transfer of user data, maintenance of PDCP sequence numbers.

Radio Resources Control (RRC)

Broadcast of information related to the NAS and AS; establishment, maintenance and release of RRC connections; establishment, reconfiguration and release of Radio Bearers and radio resources; RRC connection mobility functions; control of requested QoS; UE measurement reporting and control; outer loop power control; ciphering control.

Radio Link Control (RLC)

Transmission and reception of signaling and data packets, including buffering, segmentation and concatenation of packets. Comprises three entity types, for acknowledged mode, unacknowledged mode, and transparent modes.

Medium Access Control (MAC)

Mapping between logical channels and transport channels, selection of the appropriate Transport Formats for each Transport Channel, priority handling between UEs, multiplexing/demultiplexing of upper layer PDUs to/from transport block (sets) on common and dedicated transport channels.

UMTS Layer 1

Interface to the UMTS modem functions implemented on the Baseband Modem.

The GERAN access stratum functionality 140 comprises both BSS and SGSN functionality. The BSS functionality is required for support of all GSM/GPRS/EDGE services, regardless of the interface used between the access point 50 and the MNO core network 20. The SGSN functionality is required only when MNO GERAN core-network functionality is bypassed, for example for Internet-based services over GERAN.

The SGSN functionality of the GERAN access stratum functionality 140 comprises the following elements:

Sub-Network Dependent Convergence Protocol (SNDCP)

Multiplexing of several packet data protocols; data compression/decompression (optional); header compression/decompression (optional); segmentation and re-assembly.

Logical Link Control (LLC)

LLC provides peer-to-peer unacknowledged and acknowledged data transfer, and the GPRS ciphering functionality.

The BSS functionality of the GERAN access stratum functionality 140 comprises the following elements:

Radio Link Control/Medium Access Control (RLC/MAC)

RLC/MAC supports acknowledged and unacknowledged modes; segmentation and reassembly of LLC PDUs; multiplexing to several physical channels; broadcast of system information.

Radio Resource Management (RR)

RR connection establishment, maintenance, and releases; system information broadcast; packet data resource management.

GSM/GPRS Layer 1

Interface to the GSM/GPRS/EDGE modem functions implemented in the Baseband Modem.

The software running in the access point 50 also includes a UMA client 142, allowing the access point 50 to use the UMA protocol in a non-standard configuration. Specifically, the standard UMA protocol is designed to enable a GSM MS or UMTS UE, which includes a UMA client and an unlicensed spectrum air interface such as IEEE802.11b/g or Bluetooth, to communicate with the GSM/UMTS core network using unlicensed spectrum. However, the implementation in the access point 50 uses the UMA client as part of the network interface of a GSM/UMTS basestation, so that the UMA protocols, developed to communicate with a GSM/UMTS core network via an Unlicensed Network Controller (UNC), can be used to manage calls handled by that basestation, including handover to/from the macro network.

The access point 50 also includes one or more IP device clients 144, to enable the transfer of calls, control information or data between the "mobile domain" (mobile phones camped onto the access point 50 and traffic paths into the MNO core network 20) and other IP devices, such as a VoIP/POTS port within the IP gateway 60 for fixed-line phone/fax services, an AV port within the IP gateway 60 for IPTV and/or video services, PC's or Servers 44 on the local Ethernet LAN, or remote webpages and/or servers 72 accessible over the internet 70 via the IP gateway 60.

Each IP device client 144 has access to the traffic path within the access point 50 and can be controlled by the session controller in the ZN layer 132, which can initiate and terminate calls/data sessions with the accessible IP devices. The inclusion within the access point 50 software architecture of IP device clients which are specific to a particular device or service enables traffic from that particular device or service to be routed within the access point 50, such that it can be connected to the GSM/UMTS mobile devices accessed via the GSM or UMTS Access Strata or the MNO Core Network accessed via the UMA client.

Figure 4:
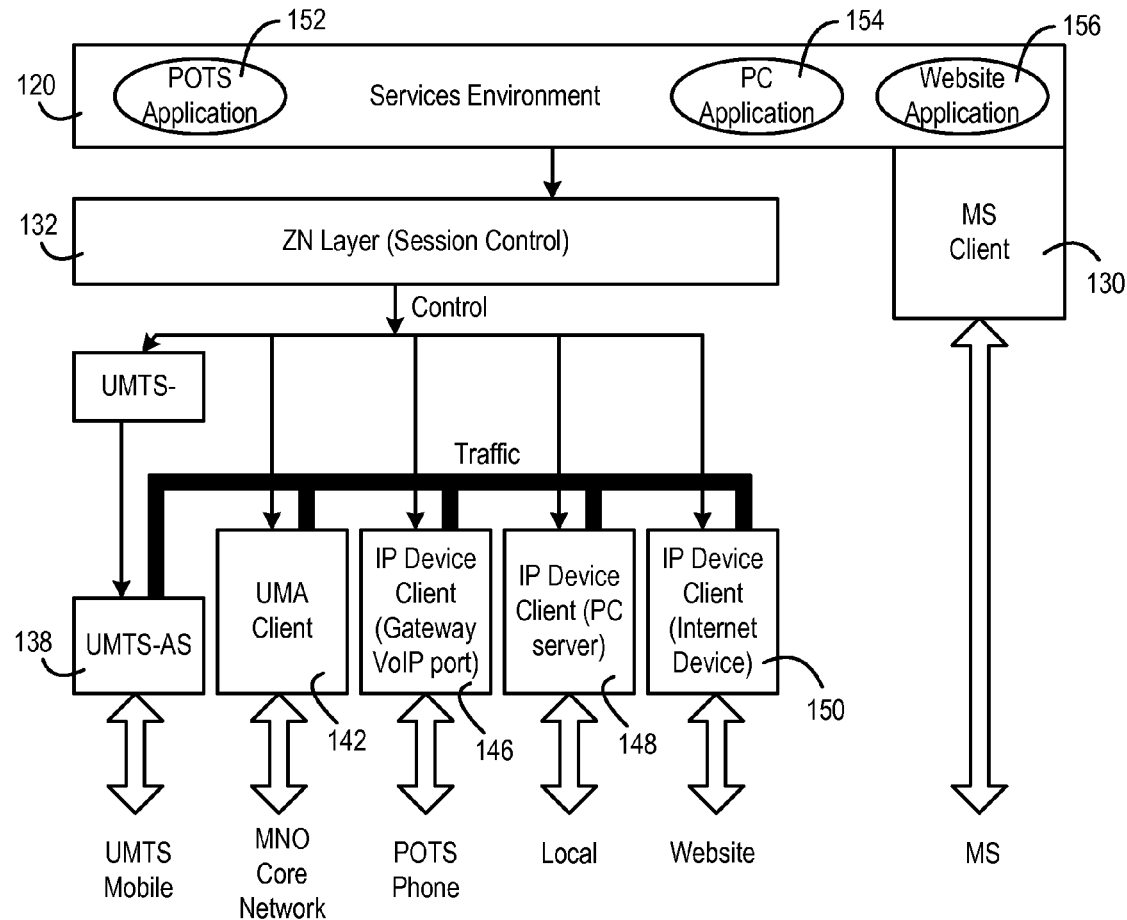
FIG. 4 is a diagram illustrating the interconnections enabled by the basestation in accordance with the present invention.

FIG. 4 is a schematic diagram, illustrating the traffic and control interconnections that are enabled, in one embodiment of the invention. In the embodiment illustrated in FIG. 4, the software includes three IP device clients, namely a first IP device client 146 that can connect through a VoIP port of the IP gateway 60 to a POTS phone 62, a second IP device client 148 that can connect over the LAN to a local PC or server 44, and a third IP device client 150 that can connect over the IP network 70 to a website on an internet device 72. The services environment 120 then includes a POTS application 152, a PC application 154 and a website application 156 corresponding to these three IP device clients. In such cases, it is also likely that application software, specific to the particular service, will be required in the device which is to be connected to such the IP gateway 60, the local PC 44, or the GSM/UMTS mobile device 30. Suitable application software can be provided by the MNO that operates the access point 50, in order to facilitate the desired overall service.

Applications operating within the services environment 120 are then able to initiate and terminate calls or data sessions with the mobiles camped on the access point 50 and the MNO core network 20 and, via the IP device clients, are able to access and control services within the gateway, devices connected to the Ethernet LAN and remote devices accessible via the Internet. The user is also able to interact with the management system 74 through the MS client 130.

The control of the initiation and termination of the "calls" or connections is handled by a Java application specific to the service which is executing within the access point 50 services environment. Functions provided within the API library (shown in FIG. 3 above) of the access point 50 permit call control and routing via session control implemented in the network layer 132 of the access point 50.

Thus, the services environment 120, located within a home or office based access point 50, effectively joins four distinct networks, namely the MNO Core Network 20 (via the IP gateway 60), the internet (again via the IP gateway 60), the local LAN (via the Ethernet port), and local mobile devices camped on the access point 50 (via a GSM or UMTS air interface).

For example, this allows various service options.

A direct connection can be made between GSM/UMTS mobile devices camped on the access point 50 and devices attached to the local Ethernet LAN network such as PCs/Servers, webcams and other home security and/or home automation sensors and actuators. This connection is local to the access point 50 and does not require the involvement of the MNO core network.

A direct connection can be made between GSM/UMTS mobile devices camped on the access point 50 and the Internet without the need for MNO Core Network involvement. This allows GSM/UMTS mobile devices to access webpages and internet content without burdening the core network 20 with this traffic, and therefore has the advantage for the MNO that its infrastructure costs can potentially be lower.

A direct connection can be made between GSM/UMTS Mobile devices camped on the access point 50 and GSM/UMTS devices camped on other access points accessible directly via the Internet. This capability allows information such as presence of a user on their home access point 50 or voice/video calls to be conveyed directly from one access point to another access point over the Internet without the involvement of the MNO core network 20.

A direct connection can be made between the MNO core network 20 and devices or applications within the IP gateway device 60 and other devices or applications connected to the local Ethernet LAN network. This capability would for example allow:

i. the VoIP/POTS port on the IP gateway device 60 to be used to make phone calls within the MNO network using the SIM card within the access point 50 to define the "mobile number" and other necessary details of the POTS phone;

ii. the IPTV port on the IP gateway device 60 to be used to display incoming video calls, mobile TV streams or MMS messages on the connected TV screen;

iii. a user, roaming in the MNO wide-area network, to access his home PC or server, or home security and/or automation devices attached to the local Ethernet LAN via his GSM/UMTS mobile device and the MNO core network 20 and MNO radio network 10.

The access point 50 can therefore provide improved services to users, while reducing costs for the mobile network operator.

The invention claimed is:

1. A basestation having Access Stratum functionality comprising Medium Access Control functionality, for use in a cellular communications network having a radio interface for communication with wireless communications devices by means of a wide area cellular wireless communications protocol,
   wherein the basestation is adapted to terminate ciphering of signals received over the radio interface in order to be able access data packets being transferred over the radio interface,
   wherein the basestation has an Internet Protocol interface for communication over a public Internet with a node in a Radio Access Network of the cellular communications network, and
   wherein the basestation is adapted to encrypt data transmitted over the Internet Protocol interface to the cellular communications network.

2. A basestation as claimed in claim 1, wherein the Access Stratum functionality comprises Radio Resource Management functionality.

3. A basestation as claimed in claim 1, wherein the Access Stratum functionality comprises Radio Link Control/Medium Access Control functionality.

4. A basestation as claimed in claim 3, wherein the Radio Link Control/Medium Access Control functionality allows the basestation to terminate ciphering performed over the radio interface in order to be able to access said data packets.

5. A basestation as claimed in claim 1, being adapted to use IPSec for encryption of said data for transmission to the cellular communications network.

6. A basestation as claimed in claim 1, wherein the cellular wireless communications protocol is a wide area cellular wireless communications protocol.

7. A basestation having Access Stratum functionality comprising Medium Access Control functionality, for use in a wide area cellular communications network comprising a Radio Access Network and a Core Network,
   wherein the basestation has a radio interface, for communication with user equipment devices located in a cell associated with the basestation,
   wherein the basestation has an Internet Protocol interface, for communication over a public broadband Internet connection with a node in the Radio Access Network of the cellular communications network,
   wherein the basestation is adapted to terminate ciphering of signals received over the radio interface in order to be able to access data packets transferred across said radio interface, and
   wherein the basestation is adapted to encrypt data transmitted over the Internet Protocol interface to the cellular communications network.

8. A basestation as claimed in claim 7, being adapted to use IPSec for encryption of said data for transmission to the cellular communications network.

* * * * *